United States Patent
Ling

(10) Patent No.: US 6,980,597 B1
(45) Date of Patent: Dec. 27, 2005

(54) FINE GRANULARITY SCALABILITY USING BIT PLANE CODING OF TRANSFORM COEFFICIENTS

(75) Inventor: Fan Ling, Santa Clara, CA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/856,234

(22) PCT Filed: Nov. 4, 1999

(86) PCT No.: PCT/US99/25973

§ 371 (c)(1),
(2), (4) Date: May 18, 2001

(87) PCT Pub. No.: WO00/35187

PCT Pub. Date: Jun. 15, 2000

Related U.S. Application Data

(60) Provisional application No. 60/110,882, filed on Dec. 4, 1998.

(51) Int. Cl.[7] .............................................. H04N 7/12
(52) U.S. Cl. ............... 375/240.19; 382/281; 348/398.1
(58) Field of Search ..................... 375/240.19, 240.2, 375/240.08; 348/398.1, 399.1, 414.1; 382/281

(56) References Cited

U.S. PATENT DOCUMENTS

| | | |
|---|---|---|
| 5,029,122 A | 7/1991 | Uetani |
| 5,321,776 A | 6/1994 | Shapiro |
| 5,717,394 A * | 2/1998 | Schwartz et al. ............. 341/51 |
| 5,768,535 A | 6/1998 | Chaddha et al. |

FOREIGN PATENT DOCUMENTS

| | | | |
|---|---|---|---|
| AU | EP 0855838 A2 * | 7/1998 | ............ H04N 7/26 |
| EP | 0 855 838 | 7/1998 | |

OTHER PUBLICATIONS

Fan Ling; Weiping Li; Hongqiao Sun: "Bitplane coding of DCT coefficients for image and video compression," Proceedings of the SPIE, vol. 3653, Jan. 27, 1999, pp. 500-508.
Fan Ling; Weiping Li: "Dimensional Adaptive Arithmetic Coding for Image Compression," Proceedings of the 1998 IEEE International Symposium on Circuits and Systems, 'Online', vol. 4, Jun. 3, 1998, pp. 13-16.
ISO/IEC JTC1/SC29/WG11, MPEG98/M4204, Dec., 1998.

* cited by examiner

Primary Examiner—Gims Philippe
(74) Attorney, Agent, or Firm—Robert P. Marley

(57) ABSTRACT

A system for efficient bit plane coding of transform coefficient data, such as DCT data used in a video coding system. Decimal values for the transform coefficients are converted to binary values, where each bit occupies a corresponding bit plane, from the most significant bit to the least significant bit. One bit from each coefficient is provided in a common bit plane. A one-bit flag or codeword is used for coding one or more initial all-zero bit planes, while another one-bit flag is used for designating the first subsequent non-all-zero plane. For the first non-all-zero plane, a reduced coding table is used to provide codewords that follow the one-bit flag.

16 Claims, 4 Drawing Sheets

FINE GRANULARITY SCALABILITY USING BIT PLANE CODING OF TRANSFORM COEFFICIENTS

BACKGROUND OF THE INVENTION

This application claims the benefit of U.S. Provisional Application No. 60/110,882, filed Dec. 4, 1998.

The present invention relates to a method and apparatus for efficient bit plane coding of transform coefficients, such as Discrete Cosine Transform (DCT) coefficients. Such coefficients may be used in a variety of applications, including digital video encoding and decoding. In particular, an improvement upon the technique known as Fine Granularity Scalability using Bit plane (FGSB) coding is presented.

FGSB coding keeps the base layer coding technique untouched. For example, the base layer coding technique can be MPEG-2, MPEG-4, or any DCT-based image/video coding technique. In the base layer, the DCT coefficients are coded using a relatively coarse quantization to obtain low bit rate data.

FIG. 1 illustrates a prior art apparatus for Fine Granularity Scalability using Bit plane (FGSB) coding. With FGSB coding, a difference (or residue) is obtained between the original integer DCT coefficients and dequantized DCT coefficients. As shown in the encoder 100, for example, an original block of DCT coefficients is quantized at a quantizer 110, then the quantized coefficients are dequantized (i.e., inverse quantized) at an inverse quantizer 120 to obtain the dequantized DCT coefficients. A difference block of DCT coefficients is output from a subtracter 130 and provided to a bit plane coding function 140 before being communicated across a channel. For example, the data may be communicated in a broadband communication network, such as a cable or satellite television network, or a computer network, such as a local area network (LAN), metropolitan area network (MAN), wide area network (WAN), internet, intranet, and the Internet. As mentioned, the base layer DCT coefficient data is coded conventionally.

The bit plane coding function 140 includes one or more tables 145 for coding the bits in each bit plane. The tables include an "all-zero" codeword that is used when a bit plane has all zero values.

Since each DCT difference block typically has a few bit planes (e.g., up to four to eight-planes in typical applications), fine granularity is achieved at very low complexity cost. The number of bit planes is determined by the number of bits needed to code the largest difference value. Essentially, DCT difference data in the successive bit plane layers can be used to reduce the DCT coefficient quantization error. One or more of the bit plane layers can be recovered by a decoder according to the available channel bandwidth and the decoder's processing speed. The bit plane layers are recovered starting from the layer carrying the most significant bit of the DCT difference data, then the layer carrying the next most significant bit of the DCT difference data, and so forth.

FGSB coding can be simplified into the following steps:

1. After performing base layer coding, which is DCT based, take the difference between the original DCT coefficients and the dequantized DCT coefficients. Find the number of bit planes required to code this difference block.

2. Find out the maximum number of bit planes from all the difference blocks of one video frame.

3. Code the maximum number of bit planes at the very beginning of one frame's enhancement layer bitstream.

4. Sequentially code the bit planes of one frame starting from the Most Significant Bit (MSB) level.

5. When coding a bit plane, 2-D symbols are formed of two components. The first component indicates the number of consecutive zeroes (e.g., zero run-length) until the next "1.". The second component is a one-bit flag that indicates if there are any "1"s left in the current bit plane. The second component is therefore an End-Of-Plane (EOP) indicator. These 2-D symbols are then entropy coded. If there are no "1"s at all in the current bit plane, an "all-zero" symbol is coded.

The following illustrates an example of coding of a particular bit plane using the above approach, designated "prior art 1".

| Position: | 0 | 1 | 2 | 3 | 4 | 5 | 6 | ... | 63 |
|---|---|---|---|---|---|---|---|---|---|
| bit value: | 1 | 0 | 0 | 1 | 0 | 1 | 0 | 0's | 0 |
| prior art 1, 2-D symbol | (0,0) | (2,0) | | (1,1) | | | | | |

In the first row, the "position" is the sequence of the bit in the bit plane. For example, for an 8×8 bit plane, there are 64 bits, e.g., 0–63. In the second row, the bit value is shown, either a binary 0 or 1.

In the third row, the 2-D symbols used by the prior art scheme discussed above are shown. Specifically, at position 0, the bit value is "1", and the symbol is (0,0). The first component of the symbol, "0", indicates that the run-length of zero symbols is 0 (i.e., there is no zero) before the next "1". The second component of the symbol, "0", which is the EOP indicator, indicates that there is at least one subsequent "1" in the bit plane. Note that the symbols are given in decimal numbers, which are later converted to binary (e.g., $2_{10}=10_2$).

At position 1, the bit value is "0", and the symbol is (2,0). The first component of the symbol, "2", indicates that the run-length of zero symbols is 2 (i.e., there are zeroes in positions 1 and 2). Thus, the distance to the next "1" is 2 bit values (i.e., position 3). The second component of the symbol, "0", again indicates that there are additional "1's" in the bit plane (i.e., in addition to the "1" in position 3).

At position 4, the bit value is "0", and the symbol is (1,1). The first component of the symbol, "1", indicates that the run-length of zero symbols is 1 (i.e., there is a zero in position 4). Thus, the distance to the next "1" is 1 bit value (i.e., position 5). The second component of the symbol, "1", indicates that there are no additional "1's" in the bit plane (after position 5).

The above FGS coding method is discussed in ISO/IEC JTC1/SC29/WG11, MPEG98/M4204, December 1998, "Fine Granularity Scalability Using Bit plane Coding of DCT Coefficients." With this technique, a bit plane with all zeroes is coded using the "all-zero" symbol, regardless of which bit plane layer is being coded. The all-zero symbol may need to be coded for more than one bit plane layer for a given DCT block. This is disadvantageous due to the size of the all-zero symbol, and the fact that it increases the coding table size.

In particular, the size (e.g., bit length) of the all-zero symbol is dictated by the entropy coding (e.g., Huffman coding) performed on the bit plane's 2-D symbols. As is known, when coding source symbols that are not equally probable, it is efficient to use variable-length code words. The probability of occurrence of the source symbols is used to select the code words so that more probable source symbols are assigned a shorter code word.

With these constraints, the length of the all-zero symbol is typically two bits or more. Furthermore, since there are several thousand 8×8 DCT blocks in an image (e.g., consider a 525×480 pixel NTSC image), the data overhead caused by the all-zero symbol is significant.

Accordingly, it would be desirable to provide a method and apparatus for efficient bit plane coding which improves over the above techniques. The system should reduce the number of bits required to indicate the presence of a bit plane in which all values are zero. The system should avoid the need for multiple "all-zero" symbols in the initial MSB bit plane layers of a single block having all zeroes, thereby reducing the data overhead for coding the bit plane.

The system should improve coding efficiency by reducing the number of symbols in a MSB level entropy coding table, thereby reducing the code length of the remaining symbols in the table.

The system should be compatible with coding schemes that provide multiple coding tables which are used for the different bit plane layers. Since the probability of occurrence of specific bits is different for the different bit plane layers, coding efficiency can be optimized by tailoring the coding table to the bit plane layer. This concept is discussed further in the Ph.D. dissertation entitled "Optimization of Entropy Coding Efficiency Under Complexity Constraints in Image and Video Compression," (1998), Section 4.3, by Dr. Fan Ling, catalogued at the Electrical Engineering Department, Lehigh University, Pennsylvania, USA.

The present invention provides a system having the above and other advantages.

SUMMARY OF THE INVENTION

The present invention relates to a method and apparatus for efficient bit plane coding of transform coefficients.

A method for efficient coding of a plurality of bit planes in which transform coefficient data is carried, includes the step of providing a codeword having a first state (e.g., "0") designating that a bit plane has all binary zeroes, and a second state (e.g., "1") designating that a bit plane does not have all binary zeroes. The most significant bit (MSB) bit plane is coded with the "0" when the MSB bit plane has all binary zeroes. Proceeding from the MSB bit plane toward the least significant bit (LSB) bit plane, each successive bit plane that has all binary zeroes is coded with the "0", if any such successive bit planes are present, until a first bit plane that does not have all binary zeroes is reached. The first bit plane is coded with the "1", followed by at least one codeword obtained from a first entropy coding table according to the bits in the first bit plane.

The codeword is preferably a one-bit codeword.

Importantly, the first entropy coding table does not include a multi-bit codeword for coding a bit plane with all binary zeroes. Thus, the size of this coding table can be reduced relative to prior art schemes, which, in turn, reduces the number of coding bits.

A second, conventional entropy coding table is provided for coding one or more bit planes that follow the first bit plane. This coding table includes a multi-bit codeword for coding a bit plane with all binary zeroes, and is therefore not reduced in size.

The transform coefficient data may include Discrete Cosine Transform (DCT) data, and/or image data.

A corresponding decoding method includes the step of (a) providing a decoding function for a codeword having a first state (e.g., "0") designating that a bit plane has all binary zeroes, and a second state (e.g., "1") designating that a bit plane does not have all binary zeroes. Proceeding from the MSB bit plane toward the least significant bit (LSB) bit plane, the "0" is decoded for each successive bit plane that has all binary zeroes, if any such successive bit planes are present, until a first bit plane that does not have all binary zeroes is reached. The "1" is decoded for the first bit plane, and a first entropy decoding table is used for decoding at least one codeword that follows the "1".

A related digital signal, and encoder and decoder apparatuses are also presented.

DETAILED DESCRIPTION OF THE INVENTION

Figure 1:
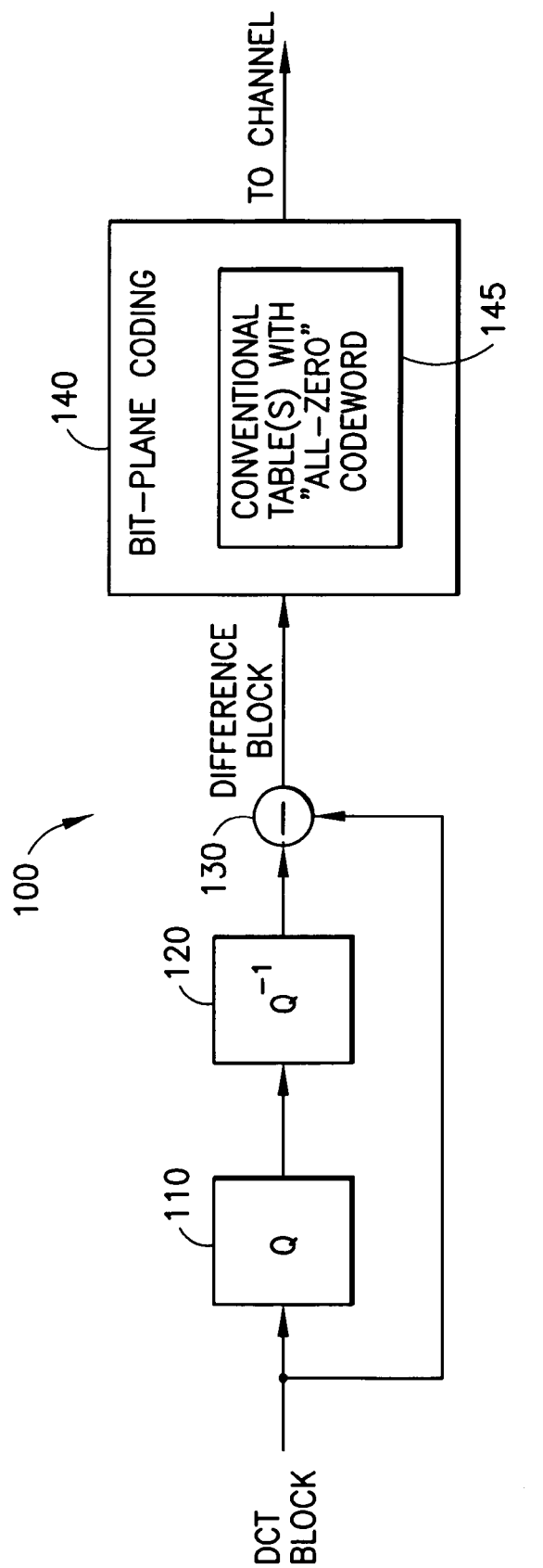
FIG. 1 illustrates a prior art apparatus for Fine Granularity Scalability coding using Bit plane (FGSB) coding.

The present invention relates to a method and apparatus for efficient bit plane coding of transform coefficients.

The present invention is illustrated with reference to the table below, in which the bit plane coding symbols discussed in ISO/IEC JTC1/SC29/WG11, MPEG98/M4204, discussed above, are designated by "prior art 2", and bit plane coding symbols of the present invention are designated by "invention".

An example 8×8 DCT difference block as follows is assumed:

| Position: | 0 | 1 | 2 | 3 | 4 | 5 | 6 | 7 | ... | 63 |
|---|---|---|---|---|---|---|---|---|---|---|
| Decimal Value: | 11 | 1 | 10 | 3 | 2 | 1 | 0 | 0 | ... | 0 |
| Bit planes: | | | | | | | | | | |
| MSB-0: | 0 | 0 | 0 | 0 | 0 | 0 | 0 | ... | 0 | (all zeroes) |
| MSB-1: | 1 | 0 | 1 | 0 | 0 | 0 | 0 | ... | 0 | |
| MSB-2: | 0 | 0 | 0 | 0 | 0 | 0 | 0 | ... | 0 | (all zeroes) |
| MSB-3: | 1 | 0 | 1 | 1 | 1 | 0 | 0 | ... | 0 | |
| MSB-4: | 1 | 1 | 0 | 1 | 0 | 1 | 0 | ... | 0 | |

"Prior art 2" Approach:

| MSB-0: | (all-zero symbol), |
|---|---|
| MSB-1: | (0,0), (1,1), |
| MSB-2: | (all-zero symbol) |
| MSB-3: | (0,0), (1,0), (0,0), (0,1) |
| MSB-4: | (0,0), (0,0), (1,0), (1,1) |

Present invention:

| MSB-0: | 0 (one-bit flag = true) |
|---|---|
| MSB-1: | 1 (one-bit flag = false), (0,0), (1,1), |
| MSB-2: | (all-zero), |
| MSB-3: | (0,0), (1,0), (0,0), (0,1) |
| MSB-4: | (0,0), (0,0), (1,0), (1,1) |

The base or MSB bit plane layer bits are designated "MSB-0," the second MSB bit plane layer bits are designated "MSB-1," the third MSB bit plane layer bits are designated "MSB-2," the fourth MSB bit plane layer bits are designated "MSB-3," and the fifth MSB bit plane layer bits are designated "MSB-4." MSB-4 is essentially the Least Significant Bit (LSB) bit plane layer.

The decimal values of the DCT difference coefficients are provided in positions 0–63. The corresponding binary values are provided in the different layers. For example, the decimal value 11 corresponds to the binary value $01011_2$, where the first "0" (reading from left to right) is the MSB. This "0" is therefore provided in MSB-0. The remaining binary digits are distributed in MSB-1 ("1"), MSB-2 ("0"), MSB-3 ("1"), and MSB-4 ("1").

Note that all the MSB-layer 0 values in this example are zeroes, indicating that the decimal values of the coefficients in the current block are all less than fifteen. The five bit plane layers allow decimal values up to 31. Of course, fewer or more bit planes may be used.

Since different DCT blocks have different numbers of bit planes, the MSB layer bit planes have a high probability of being all zero. The present invention takes advantage of this condition.

Coding using the prior art 2 technique in the above example is first discussed. MSB-0 is coded using the "all-zero" symbol, which typically requires two or more coded bits. This indicates the layer is all zeroes. For example, a coding table may be used that assigns a code word to a symbol. The number of coded bits will vary based on the coding table size and the entropy coding scheme used.

MSB-1 is coded using the (0,0) symbol, where the first "0" indicates a zero run length of zero (i.e., no zeroes) before the next "1", and the second "0" indicates there are additional "1's" left in the bit plane after the next "1". Next, the (1,1) symbol is used, where the first "1" indicates a zero run length of one (i.e., one zero) before the next "1", and the second "1" indicates there are no additional "1's" left in the bit plane after the next "1".

MSB-2 is coded using the "all-zero" symbol, indicating the layer is all zeroes.

MSB-layer 3 ("1") is coded using the (0,0) symbol. Next, position 1 ("0") is coded using the (1,0) symbol, position 3 ("1") is coded using the (0,0) symbol, and position 4 ("1") is coded using the (0,1) symbol.

Position 0 of MSB-4 ("1") is coded using the (0,0) symbol, position 1 ("1") is coded using the (0,0) symbol, position 2 ("0") is coded using the (1,0) symbol, and position 4 ("0") is coded using the (1,1) symbol.

Accordingly, the prior art 2 technique uses the "all-zero" symbol twice, in MSB-0 and MSB-2. This technique is not optimal since the "all-zero" symbol has a length of two bits or more, and the presence of this symbol increases the length of the coding table. In contrast, the present invention allows the use of a reduced coding table, which does not have the all-zero symbol as an entry, for coding of MSB-0 and MSB-1.

Specifically, with the present invention, a one bit flag is introduced to indicate if the MSB bit plane is all zeroes or not. For example, "0" can indicate all zeroes, and a "1" can indicate not all zeroes, or vice-versa. However, whenever a "1" is coded, the flag is not coded for all the following lower level bit planes of the block. Thus, the coding scheme of the invention is applied to the initial MSB layer (layer 0) when it has all zeroes, to any immediately following layers that have all zeroes, if such layers are present, and to the first following layer that does not have all zeroes.

If any further all-zero bit planes are encountered (e.g., after the bit plane encoded with the "1" flag), they are coded using the "all-zero" symbol of prior art 2.

Thus, in MSB-0, the (0) codeword or flag is used to indicate that the MSB-layer 0 is all zeroes. In MSB-1, (1)(0,0) designates that the codeword "1" is to be followed in the bitstream by the codeword for (0,0), and the codeword for (1,1), which latter two codewords are obtained from the reduced coding table.

The total amount of bits is reduced relative to the prior art 2 scheme since a reduced size coding table is used that does not have the all-zero symbol as an entry. This bit savings can be significant when multiplied over the many transform blocks. For example, consider the number of 8×8 DCT blocks in a 720×480 television picture.

Figure 2:
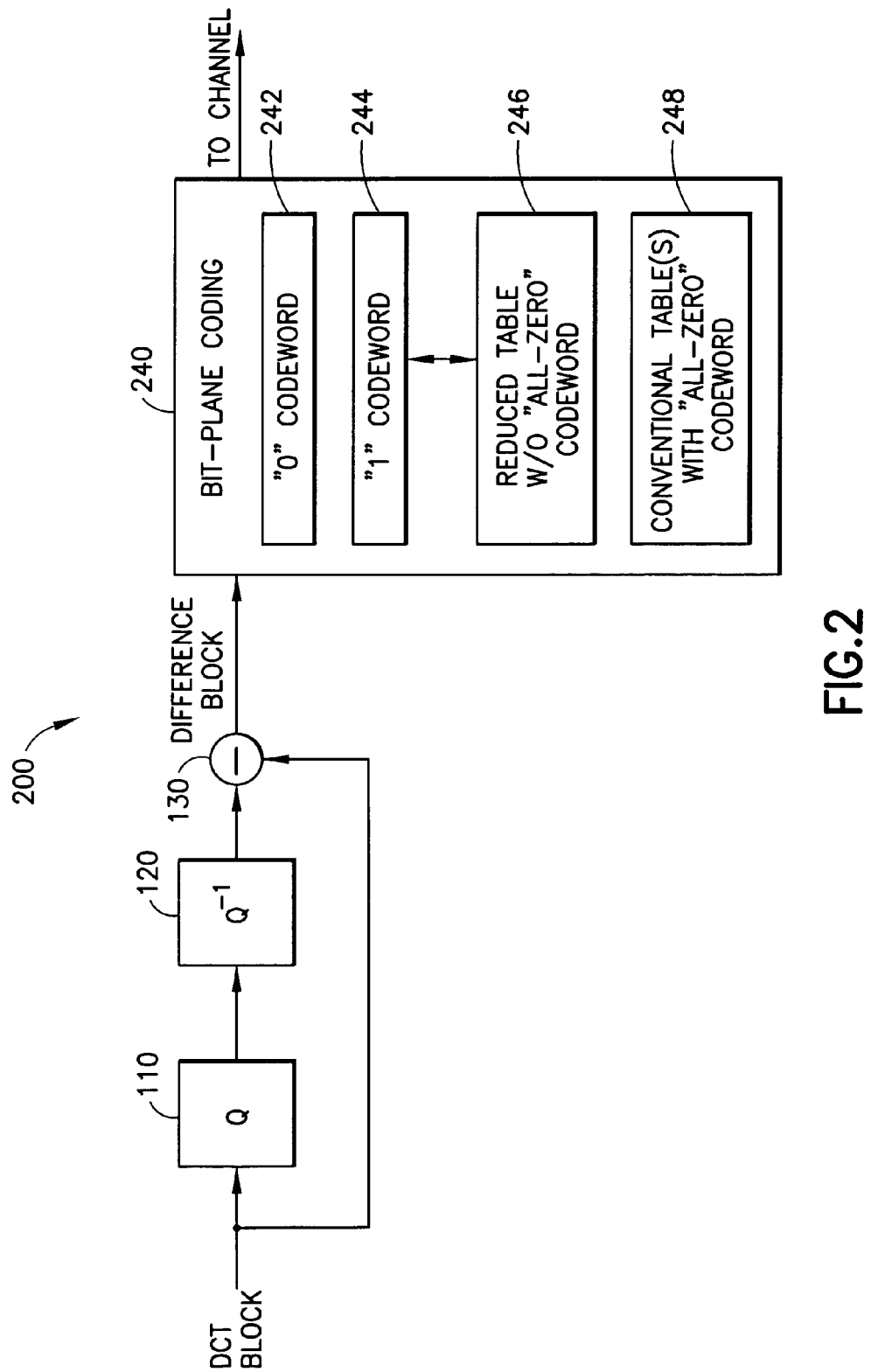
FIG. 2 illustrates an apparatus for Fine Granularity Scalability coding using Bit plane (FGSB) coding in accordance with the present invention.

FIG. 2 illustrates an apparatus for Fine Granularity Scalability coding using Bit plane (FGSB) coding in accordance with the present invention.

Like-numbered elements correspond to one another in the figures.

Here, a revised bit plane coding function 240 is used, which includes a "0" codeword function 242 for coding a "0" codeword for an all-zero bit plane as discussed herein. In the above example, MSB-0 is coded by this function 242.

A "1" codeword function 244 is provided for coding a "1" codeword for a first non-zero bit plane as discussed herein.

A reduced table 246 does not include an "all-zero" codeword and therefore has a reduced length relative to a conventional table. The reduced length results in a reduced number of coded bits for at least some of the table entries. The reduced table is associated with the "1" codeword function 244 since it is used for coding bits in the bit plane that are associated with the "1" codeword. For example, in the above example, MSB-1 is coded by the functions 244 and 246. Specifically, the symbols (0,0) and (1,1) in MSB-1 are coded by the function 246.

A conventional table function 248 includes one or more tables with the "all-zero" codeword. These tables therefore have an increased length relative to the reduced table 246, and will use additional bits to code a bit plane. One or more conventional tables may be used. If multiple conventional tables are used, each table may be tailored to specific bit planes, as discussed in the Background. Three conventional tables is believed to be suitable for FGSB video applications. Generally, the probability distribution of bits in the lower bit plane layers become more similar for each additional layer, so the advantage of a separate conventional coding table is reduced.

Figure 3:
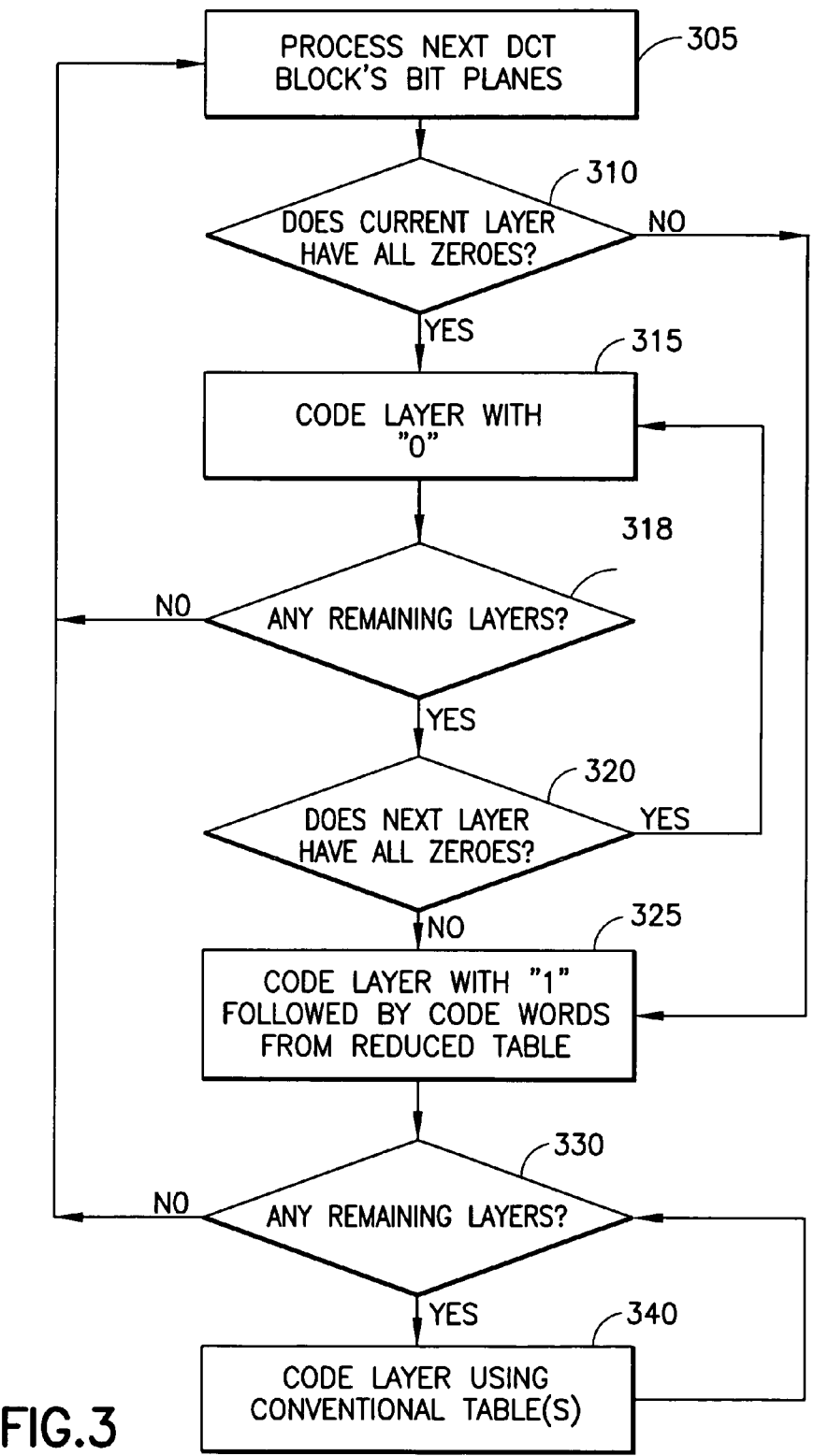
FIG. 3 illustrates a coding method in accordance with the present invention.

FIG. 3 illustrates a coding method in accordance with the present invention. At block 305, the first (i.e., most significant) bit plane of a new DCT block is processed. If the initial layer, MSB layer-0 has all zeroes (block 310), the layer is coded with a codeword "0" (block 315) in accordance with the invention.

If the initial layer does not have all zeroes, processing continues at block 325.

Following block 315, if there are any remaining layers (block 318), a determination is made as to whether any immediately following layers also have all zeroes (block 320), in which case they are also coded using the "0" symbol (block 315) in accordance with the invention.

If there are no remaining layers (block 318), the next DCT block is processed (block 305).

At block 325, if the next layer does not have all zeroes, a codeword "1" is provided, followed by one or more codewords for symbol pairs (e.g., 0,0, 0,1, 1,0 or 1,1) from a reduced table. In accordance with the invention, the reduced table does not have an all-zero symbol, so the length of the code words for at least some of the symbols is reduced relative to the conventional table. Thus, the total amount of bits needed to code a transform block is reduced.

If there are any remaining layers (block 330), the next layer is processed (block 335) using the conventional table (block 340).

Figure 4:
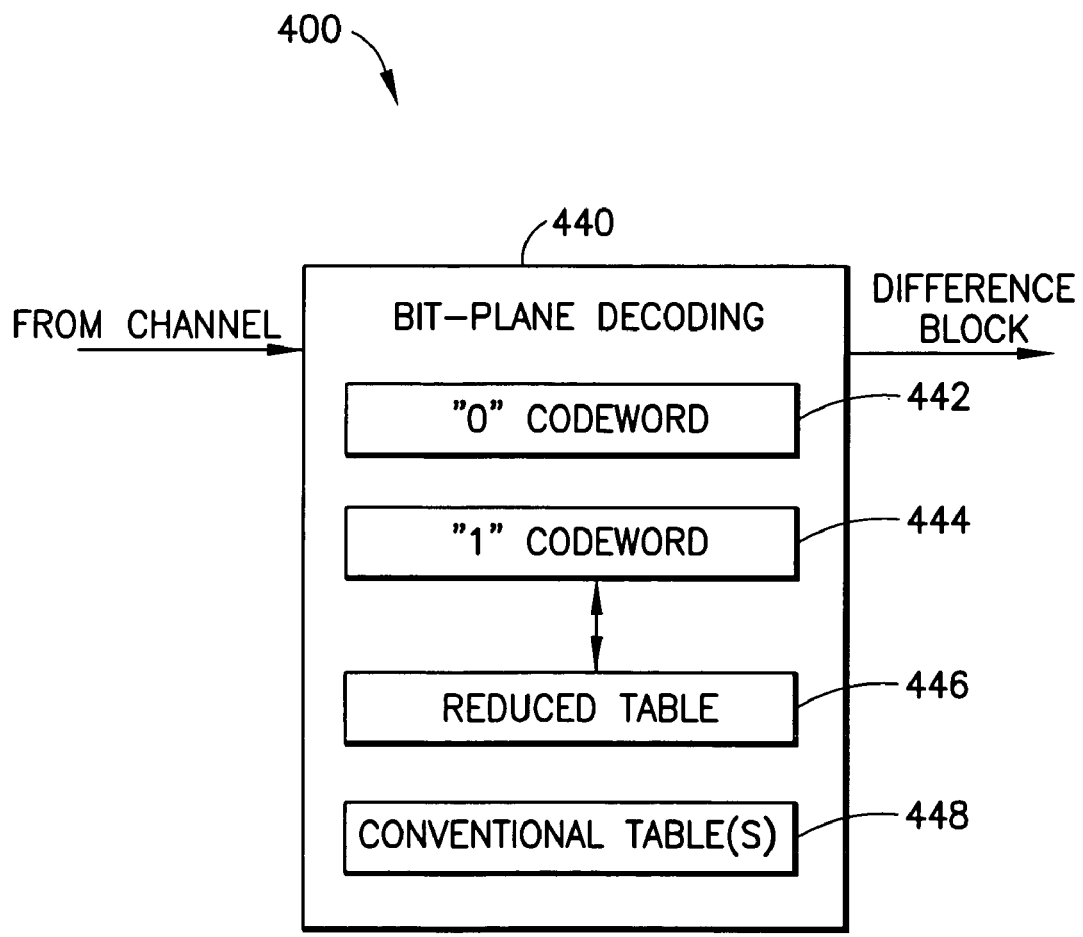
FIG. 4 illustrates a decoder in accordance with the present invention.

FIG. 4 illustrates a decoder in accordance with the present invention. The decoder 400 includes a bit plane decoding function 440, which receives a coded data stream from a channel. For example, the decoder 400 may be a set-top terminal in a cable or satellite television network for receiving digital video data, e.g., according to the MEPG standard.

The "0" codeword (decoding) function 442 is a counterpart of the coding function 242 at the encoder 200, and identifies a coded zero as a designator that the bit plane contains all zeroes. The "1" codeword (decoding) function 444 is a counterpart of the coding function 244 at the encoder 200, and identifies a coded one as a designator of a first non-zero plane following a plane coded with a "0" codeword.

The reduced table 446 is a decoding function that is a counterpart of the table 246 at the encoder 200, and identifies symbol pairs that correspond to codewords in the received data stream for the plane that is also identified by a coded "1".

The conventional table(s) 448 are decoding functions that are counterparts of the tables 248 at the encoder 200, and identify symbol pairs that correspond to codewords in the received data stream for the plane(s) that are not identified by a coded "1".

The bit plane decoding function 440 outputs transform difference block data for further, conventional processing, the details of which will be apparent to those skilled in the art.

Note that the invention is even more efficient for coding smaller decimal values, where there are several initial MSB layers with all zeroes. Generally, at least one coded bit may be saved for each layer that is coded in accordance with the invention. Typically, most of the DCT difference values are zero or close to zero, with only a few larger values whose symbols require the use of the initial MSB layers. However, in any case, coding efficiency is improved since the number of symbols from the MSB level entropy coding table is reduced by one symbol. As a result, the code length of the remaining symbols is also reduced.

This can be illustrated by a simplified example, by assuming a symbol set with three symbols, {A, B, C}. Their occurring probabilities and Huffman codes are as follows:

| symbol: | A | B | C |
|---|---|---|---|
| Probability: | 0.4 | 0.3 | 0.3 |
| Huffman code: | 1 | 01 | 00 |
| code length (bits): | 1 | 2 | 2 |

If we take one symbol (e.g., A) out of the set, the new set will be {B,C}. The above table becomes a reduced table:

| symbol: | B | C |
|---|---|---|
| Probability: | 0.5 | 0.5 |
| Huffman code: | 0 | 1 |
| code length (bits): | 1 | 1 |

Comparing the two cases, we find that by taking one symbol out of the symbol set, we reduce the code length of all the remaining symbols. This conclusion applies generally to any entropy coding technique, and is not limited to Huffman coding. Note that the overall percent savings in coded bits will be less as the number of symbols, and the symbol length, in a coding table increases. However, even a small savings for each transform block is significant when multiplied by the many blocks in an image, for example.

Accordingly, it can be seen that the present invention provides a method and apparatus for efficient bit plane coding that provides a one-bit flag or codeword for coding one or more initial all-zero bit planes and the first subsequent non-all-zero plane. For the first non-all-zero plane, a reduced entropy coding table is used to provide codewords that follow the one-bit flag. The coding table is reduced in size since it does not require a special "all-zero" codeword. Additionally, the use of a one-bit flag for designating the initial all-zero bit planes reduces the required number of coding bits over prior art schemes that require multi-bit all-zero codewords. The invention thereby reduces the data overhead for coding the bit plane.

Although the invention has been described in connection with various specific embodiments, those skilled in the art will appreciate that numerous adaptations and modifications may be made thereto without departing from the spirit and scope of the invention as set forth in the claims.

The invention is suitable for use with any bit plane coding scheme, and is not limited to bit plane coding of DCT coefficients. For example, the invention may be used with other transform coding techniques, such as the Discrete Fourier Transform, Karhunen-Loeve Transform, Walsh Hadamard Transform, wavelet transform, as well as other known spatial transforms.

Moreover, any type of entropy coding, such as Huffman coding or arithmetic coding, which uses a floating point code length, may be used.

Moreover, the invention is not limited to coding of MPEG-coded data or video data, but may be used, e.g., for coding seismic, vibrational, temperature, pressure and other types of data with 2-D or higher characteristics.

Additionally, the invention may be implemented using any known hardware, firmware, and/or software techniques.

What is claimed is:

1. A method for efficient coding of a plurality of bit planes in which transform coefficient data is carried, comprising the steps of:
   (a) providing a codeword having a first state designating that a bit plane comprises all binary zeroes, and a second state designating that a bit plane does not comprise all binary zeroes;
   (b) coding the most significant bit (MSB) bit plane with said codeword in its first state when the MSB bit plane comprises all binary zeroes;
   (c) proceeding from the MSB bit plane toward the least significant bit (LSB) bit plane, coding each successive bit plane that comprises all binary zeroes with said codeword in its first state, if any such successive bit planes are present, until a first bit plane that does not comprise all binary zeroes is reached; and
   (d) coding said first bit plane with said codeword in its second state, followed by at least one codeword obtained from a first entropy coding table according to the bits in said first bit plane, wherein:
   the first entropy coding table does not include a multi-bit codeword for coding a bit plane with all binary zeroes.

2. The method of claim 1, wherein:
   the codeword having the first and second states is a one-bit codeword.

3. A method for efficient coding of a plurality of bit planes in which transform coefficient data is carried, comprising the steps of:
(a) providing a codeword having a first state designating that a bit plane comprises all binary zeroes, and a second state designating that a bit plane does not comprise all binary zeroes;
(b) coding the most significant bit (MSB) bit plane with said codeword in its first state when the MSB bit plane comprises all binary zeroes;
(c) proceeding from the MSB bit plane toward the least significant bit (LSB) bit plane, coding each successive bit plane that comprises all binary zeroes with said codeword in its first state, if any such successive bit planes are present, until a first bit plane that does not comprise all binary zeroes is reached;
(d) coding said first bit plane with said codeword in its second state, followed by at least one codeword obtained from a first entropy coding table according to the bits in said first bit plane; and
(e) providing a second entropy coding table for coding at least one bit plane that follows the first bit plane; wherein:
the second entropy coding table includes a multi-bit codeword for coding a bit plane with all binary zeroes.

4. The method of claim 1, wherein:
the transform coefficient data comprises Discrete Cosine Transform (DCT) data.

5. The method of claim 1, wherein:
the transform coefficient data comprises image data.

6. A method for decoding a plurality of bit planes in which transform coefficient data is carried, comprising the steps of:
(a) providing a decoding function for a codeword having a first state designating that a bit plane comprises all binary zeroes, and a second state designating that a bit plane does not comprise all binary zeroes;
wherein the most significant bit (MSB) bit plane is coded with said codeword in its first state when the MSB bit plane comprises all binary zeroes;
(b) proceeding from the MSB bit plane toward the least significant bit (LSB) bit plane, decoding said codeword in its first state for each successive bit plane that comprises all binary zeroes, if any such successive bit planes are present, until a first bit plane that does not comprise all binary zeroes is reached; and
(c) decoding said codeword in its second state for said first bit plane, then using a first entropy decoding table for decoding at least one codeword that follows said codeword in its second state;
wherein the at least one codeword is obtained from a first entropy coding table according to the bits in said first bit plane and the first entropy decoding table does not include a multi-bit codeword for decoding a bit plane with all binary zeroes.

7. The method of claim 6, wherein:
the codeword having the first and second states is a one-bit codeword.

8. A method for decoding a plurality of bit planes in which transform coefficient data is carried, comprising the steps of:
(a) providing a decoding function for a codeword having a first state designating that a bit plane comprises all binary zeroes, and a second state designating that a bit plane does not comprise all binary zeroes;
wherein the most significant bit (MSB) bit plane is coded with said codeword in its first state when the MSB bit plane comprises all binary zeroes;
(b) proceeding from the MSB bit plane toward the least significant bit (LSB) bit plane, decoding said codeword in its first state for each successive bit plane that comprises all binary zeroes, if any such successive bit planes are present, until a first bit plane that does not comprise all binary zeroes is reached;
(c) decoding said codeword in its second state for said first bit plane, then using a first entropy decoding table for decoding at least one codeword that follows said codeword in its second state;
wherein the at least one codeword is obtained from a first entropy coding table according to the bits in said first bit plane; and
(d) providing a second entropy decoding table for decoding at least one bit plane that follows the first bit plane;
wherein:
the second entropy decoding table includes a multi-bit codeword for decoding a bit plane with all binary zeroes.

9. The method of claim 6, wherein:
the transform coefficient data comprises Discrete Cosine Transform (DCT) data.

10. The method of claim 6, wherein:
the transform coefficient data comprises image data.

11. An apparatus for efficient coding of a plurality of bit planes in which transform coefficient data is carried, comprising:
(a) means for providing a codeword having a first state designating that a bit plane comprises all binary zeroes, and a second state designating that a bit plane does not comprise all binary zeroes;
(b) means for coding the most significant bit (MSB) bit plane with said codeword in its first state when the MSB bit plane comprises all binary zeroes;
(c) means for coding each successive bit plane that comprises all binary zeroes with said codeword in its first state, if any such successive bit planes are present, proceeding from the MSB bit plane toward the least significant bit (LSB) bit plane, until a first bit plane that does not comprise all binary zeroes is reached; and
(d) means for coding said first bit plane with said codeword in its second state, followed by at least one codeword obtained from a first entropy coding table according to the bits in said first bit plane wherein:
the first entropy coding table does not include a multi-bit codeword for coding a bit plane with all binary zeroes.

12. The apparatus of claim 11, wherein:
the codeword having the first and second states is a one-bit codeword.

13. An apparatus for efficient coding of a plurality of bit planes in which transform coefficient data is carried, comprising:
(a) means for providing a codeword having a first state designating that a bit plane comprises all binary zeroes, and a second state designating that a bit plane does not comprise all binary zeroes;
(b) means for coding the most significant bit (MSB) bit plane with said codeword in its first state when the MSB bit plane comprises all binary zeroes;
(c) means for coding each successive bit plane that comprises all binary zeroes with said codeword in its first state, if any such successive bit planes are present, proceeding from the MSB bit plane toward the least significant bit (LSB) bit plane, until a first bit plane that does not comprise all binary zeroes is reached;

(d) means for coding said first bit plane with said codeword in its second state, followed by at least one codeword obtained from a first entropy coding table according to the bits in said first bit plane; and e) a second entropy coding table for coding at least one bit plane that follows the first bit plane; wherein:

the second entropy coding table includes a multi-bit codeword for coding a bit plane with all binary zeroes.

14. An apparatus for decoding a plurality of bit planes in which transform coefficient data is carried, comprising:

(a) a decoding function for a codeword having a first state designating that a bit plane comprises all binary zeroes, and a second state designating that a bit plane does not comprise all binary zeroes;

wherein the most significant bit (MSB) bit plane is coded with said codeword in its first state when the MSB bit plane comprises all binary zeroes;

(b) means for decoding said codeword in its first state for each successive bit plane that comprises all binary zeroes, if any such successive bit planes are present, proceeding from the MSB bit plane toward the least significant bit (LSB) bit plane, until a first bit plane that does not comprise all binary zeroes is reached; and (c) means for decoding said codeword in its second state for said first bit plane, then using a first entropy decoding table for decoding at least one codeword that follows said codeword in its second state;

wherein the at least one codeword is obtained from a first entropy coding table according to the bits in said first bit plane and the first entropy decoding table does not include a multi-bit codeword for decoding a bit plane with all binary zeroes.

15. The apparatus of claim 14, wherein:

the codeword having the first and second states is a one-bit codeword.

16. An apparatus for decoding a plurality of bit planes in which transform coefficient data is carried, comprising:

(a) a decoding function for a codeword having a first state designating that a bit plane comprises all binary zeroes, and a second state designating that a bit plane does not comprise all binary zeroes;

wherein the most significant bit (MSB) bit plane is coded with said codeword in its first state when the MSB bit plane comprises all binary zeroes;

(b) means for decoding said codeword in its first state for each successive bit plane that comprises all binary zeroes, if any such successive bit planes are present, proceeding from the MSB bit plane toward the least significant bit (LSB) bit plane, until a first bit plane that does not comprise all binary zeroes is reached; and (c) means for decoding said codeword in its second state for said first bit plane, then using a first entropy decoding table for decoding at least one codeword that follows said codeword in its second state;

wherein the at least one codeword is obtained from a first entropy coding table according to the bits in said first bit plane; and (d) a second entropy decoding table for decoding at least one bit plane that follows the first bit plane; wherein:

the second entropy decoding table includes a multi-bit codeword for decoding a bit plane with all binary zeroes.

\* \* \* \* \*